Oct. 9, 1934.  W. A. ANDERSON  1,975,774
PLURAL COUNTER COMPUTING MACHINE
Filed March 7, 1930  4 Sheets-Sheet 1
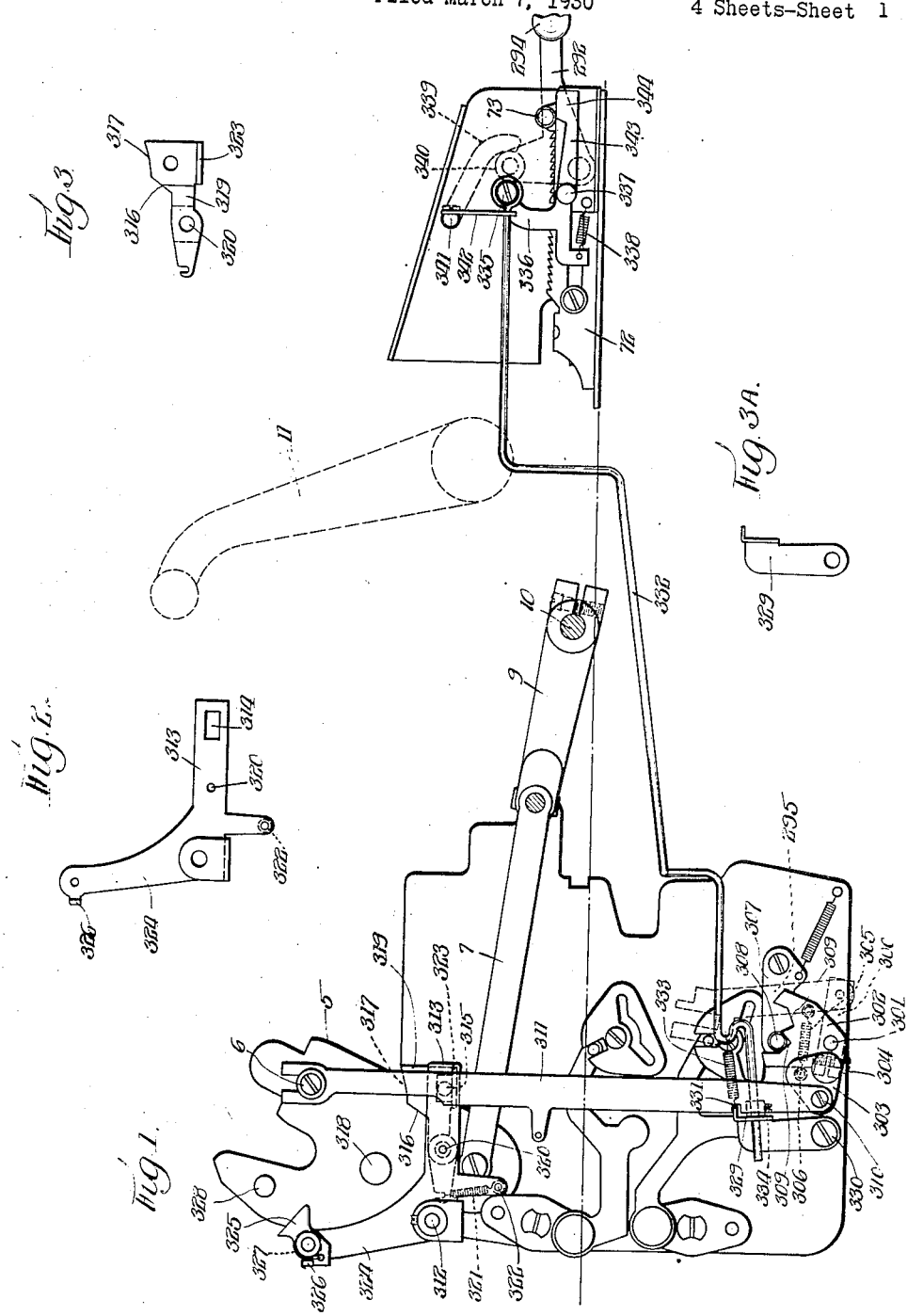

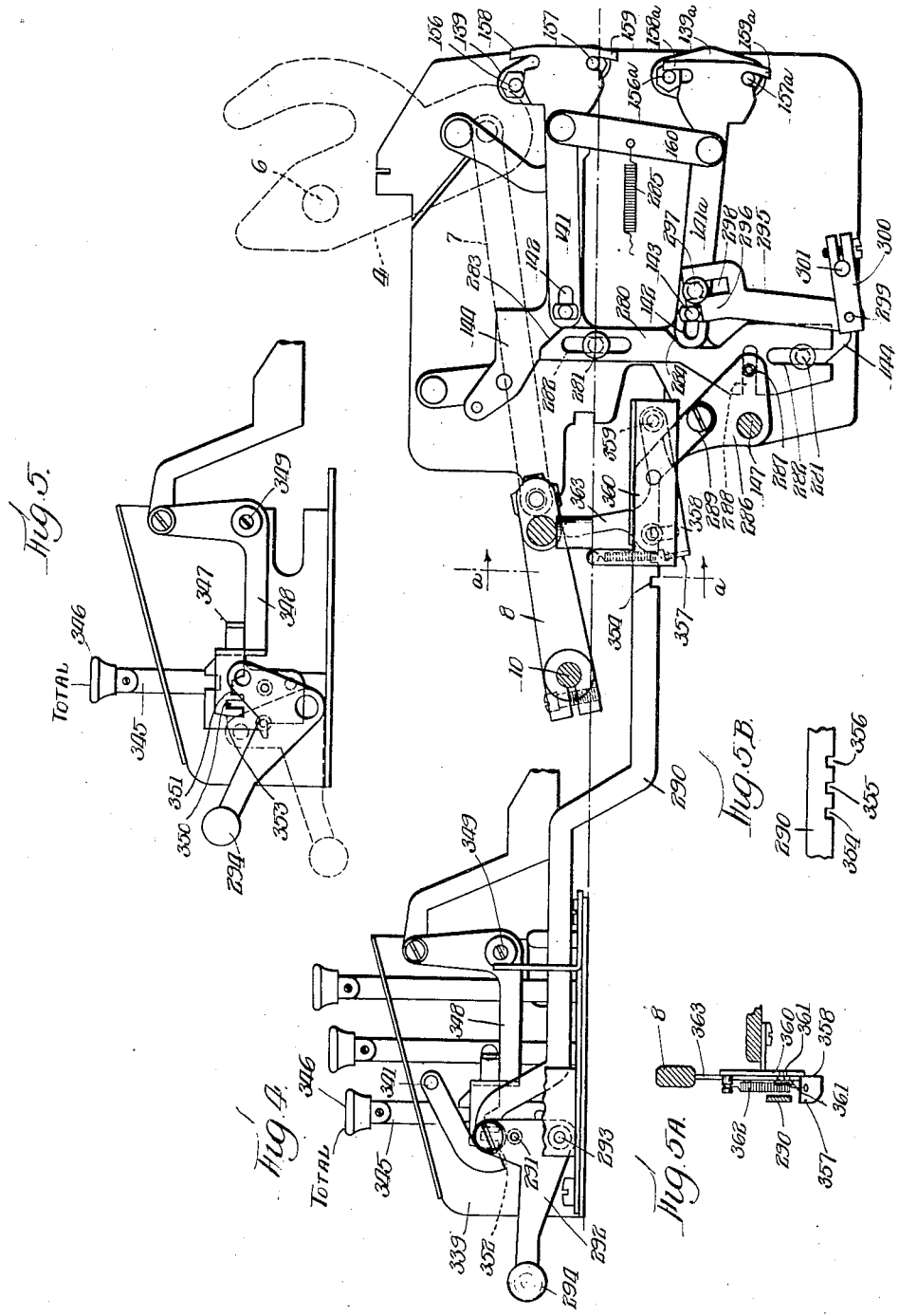

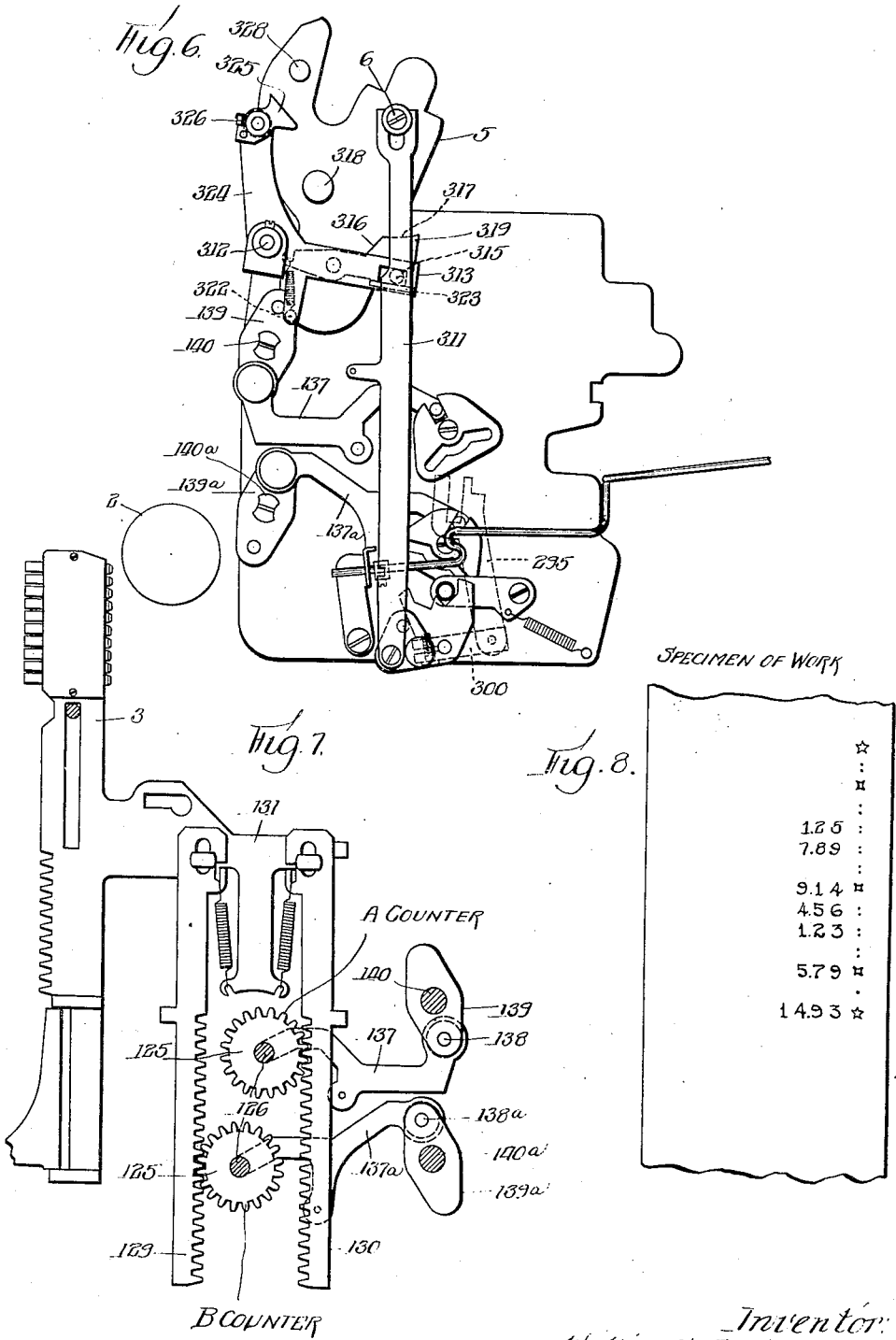

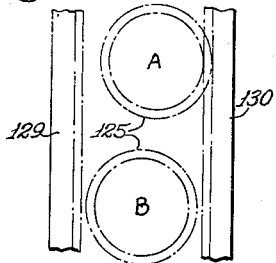
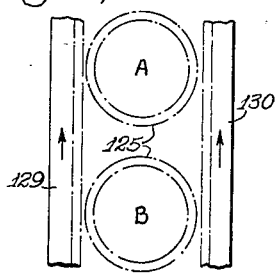
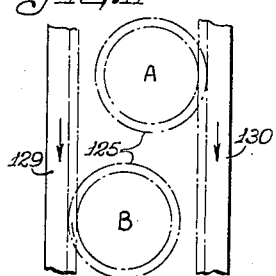
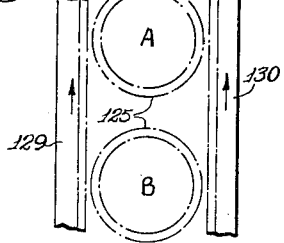
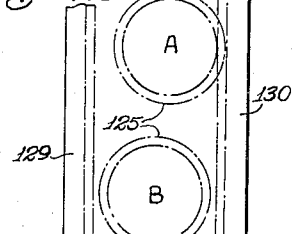
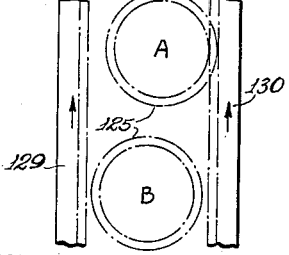
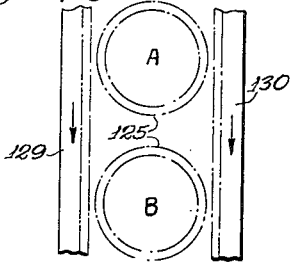
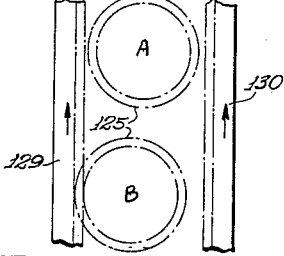
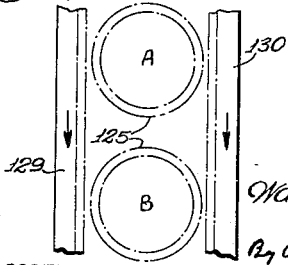

Patented Oct. 9, 1934

1,975,774

UNITED STATES PATENT OFFICE 1,975,774

PLURAL-COUNTER COMPUTING MACHINE

Walter A. Anderson, Rockford, Ill., assignor, by mesne assignments, to Underwood Elliott Fisher Company, New York, N. Y., a corporation of Delaware Application March 7, 1930, Serial No. 434,085
Renewed December 16, 1932

24 Claims. (Cl. 235—60)

This invention relates to plural-counter computing machines. Although the invention may be employed in machines of various types, I have herein shown it as embodied in a machine generally similar to the one fully disclosed in application Serial No. 236,575, filed November 29, 1927, by Oscar J. Sundstrand (now Patent No. 1,946,505, dated February 13, 1934). In that machine there are two counters designated as the A counter and the B counter, respectively, with means including a hand-operated counter-selecting lever for adjusting the mechanism to put either or both counters in use.

The operator may desire to add and print a succession of items and print the total of a certain group of items, while preserving the total of all of the items. In such an operation both counters would be used, the A counter for adding groups of items and the B counter for adding all of the items. The counter-selecting lever would be placed in position to bring both counters into use so that addition would occur simultaneously in both counters. When the operator desired to take an individual total, that is to say, the total of certain items, the counter-selecting lever would be shifted to the A counter position and the usual operation performed incidental to the taking of a total from the A counter and the clearing of said counter, the amount thus cleared out of the A counter remaining accumulated in the B counter. The operator may intend to resume the accumulation of items in both counters, but may forget to return the counter-selecting lever to the A and B counter position. I have therefore provided means whereby an individual total may be taken from the A counter and said counter cleared without shifting the counter-selecting lever from the A and B counter position. I have also provided means whereby said mechanism shall not prevent accumulation in the A counter only, when desired.

In the accompanying drawings:

Figure 1 is a fragmental left-hand side elevation of a machine embodying the features of my invention.

Fig. 2 is a detail view of a certain bell crank.

Fig. 3 is a detail view of a cam member carried by said bell crank.

Fig. 3ª is a detail view of a latch comprised in the mechanism.

Fig. 4 is a fragmental right-hand side elevation of the machine.

Fig. 5 is a fragmental view illustrating a locking means for the counter-selecting lever.

Fig. 5ª is a section on line $a$—$a$ of Fig. 4.

Fig. 5ᵇ is a fragmental side view of a link comprised in the counter-selecting means.

Fig. 6 is a fragmental left-hand side elevation.

Fig. 7 is a fragmental view of the computing and printing mechanism, looking from the right-hand side of the machine.

Fig. 8 illustrates a specimen of the work.

Figs. 9 to 17, inclusive, are diagrams showing the relations of the counters to the racks during four different sorts of cycles of operations.

The invention is herein disclosed as embodied in a machine of the general character set forth in British Patent No. 223,866 to Rockford Milling Machine Company and in said United States application Serial No. 236,575, filed November 29, 1927, although it will be understood that the invention is not limited to machines of that type. Reference may be made to the above mentioned patent and application for an understanding of features not fully illustrated and described herein.

The sheet or tape on which records are to be made may be supported by means including a cylindrical platen 2 (Fig. 7). Printing is effected by means of vertically reciprocatory type bars 3 which are raised and lowered by means including two levers 4 and 5 (Figs. 1 and 4) pivoted upon the axis 6 and arranged to be swung in unison by means including links 7, crank arms 8 and 9, a main rock shaft 10 to which the crank arms 8 and 9 are fixed, and a handle 11. It will, of course, be understood that an electric motor may be used to rock the shaft 10 if desired. When the operator pulls the handle 11 forward, the crank arms 8 and 9 swing upwardly, thereby drawing the lower ends of the levers 4 and 5 forwardly and causing the type bars to rise.

The computing mechanism, which may be either decimal or non-decimal, comprises two counters located between two sets of racks. Each counter comprises a series of pinions 125 (Fig. 7) rotatably mounted upon a transverse shaft 126. Each shaft 126 is supported for sliding movement to carry its counter into and out of engagement with the racks. Each counter is arranged to be moved into mesh with either set of racks 129 and 130, but both counters are never in mesh with the racks 129 at the same time, nor are both counters ever in engagement with the racks 130 at the same time. The upper end of each rack is attached to a rearwardly extending portion 131 on one of the type bars 3.

Each counter is moved into and out of mesh with the racks by means of two links, one at each side of the counter, the links for the upper counter being marked 137 and the links for the lower counter being designated as 137ª. The forward ends of said links have bearings to receive the ends of the shafts 126. The rear ends of the links 137 are pivoted at 138 to the lower arms of two levers 139 which are rigidly secured to a shaft 140 journaled in the framework of the machine. Similarly, the rear ends of the links 137ª are pivoted at 138ª to the upper arms of two levers 139ª which are rigidly secured to a shaft 140ª journaled in the machine frame.

The means for swinging the levers 139 and 139ª into and out of upright position so as to move the counters out of and into mesh with the racks comprises two links 141 and 141ª (Fig. 4). In the forward end of each of said links is an elongated opening 142 to receive headed studs 143 on a slide 144. The slide 144 is suspended for reciprocation longitudinally of the machine. In the reciprocation of the slide 144 the levers 139 and 139ª are rocked to move the counters into and out of mesh with the racks. The means for reciprocating the slide 144 is disclosed in said application Serial No. 236,575.

The rear end of the link 141 is notched for alternate engagement with pins 156 and 157 on opposite ends of the right-hand lever 139. Similarly, the rear end of the link 141ª is adapted for alternate engagement with pins 156ª and 157ª on opposite ends of the right-hand lever 139ª. The rear ends of the links 141 and 141ª move vertically in unison into and out of engagement with the pins 156, 157, 156ª and 157ª, said links being connected by means of a cross link 160. The purpose of such vertical movement is to shift from addition to subtraction, or vice versa. The means for thus moving the rear ends of the links 141 and 141ª is disclosed in said application Serial No. 236,575. When in their lower position (as in Fig. 4) the links position the counters for addition, subtraction being effected when the links are in their upper position. On the rear end of the link 141 are lugs 158 and 159. On the rear end of the link 141ª are similar lugs 158ª and 159ª.

Either or both counters may be used at the same time for accumulation. The means for determining which counter shall be in use or whether both shall be employed includes a slide 280 (Fig. 4) mounted on the slide 144 for vertical movement. The slide 280 is guided by means of headed studs 281 on the slide 144, said studs lying within vertically elongated openings 282 in the slide 280. On the upper end of the slide 280 is a cam surface 283 adapted to coact with the forward end of the link 141. The slide 280 also has a cam surface 284 to coact with the forward end of the link 141ª. A contractile spring 285 connected to the link 160 urges the links 141 and 141ª toward the slide 280.

When the slide 280 is in the central position shown in Fig. 4, or in its upper position, the forward end of the link 141 is confined between the upper stud 143 and the vertical rear edge of the slide 280, the link 141 being thus compelled to move back and forth with the slide 144, and the upper counter being thereby compelled to move into and out of mesh with one or the other set of racks as the slide 144 is moved back and forth. The spring 285 holds the forward end of the link 141 against the vertical rear edge of the slide 280.

When the slide 280 is in its lower position, the upper portion of the slide is out of the way of the link 141, consequently the spring 285 holds said link forward, the lever 139 being thus caused to stand in upright position with the pins 156 and 157 lying against the lugs 158 and 159. The upper stud 143 is then free to reciprocate in the slot 142 without causing any movement of the link 141, the upper counter hence remaining idle.

The means for shifting the slide 280 into any of its three positions comprises a member 286 in the nature of a bell crank lever, said member being pivoted on the axis 147. The member 286 carries a pin 287 that lies in a horizontally elongated notch 288 in the slide 280. The member 286 is pivotally connected at 289 to the rear end of a link 290, the forward end of which is pivoted at 291 to a bell crank 292 pivoted at 293. One arm of the bell crank 292 is provided with a finger knob 294. In the present embodiment of the invention the upper counter is designated the A counter and is in use for addition, subtraction or total-taking when the finger knob 294 is in its lower position. The lower counter is designated the B counter and is in use for addition, subtraction or total-taking when the finger knob 294 is in its upper position. When the finger knob is in central position (as in Fig. 4), both counters are in use for addition or subtraction, and a total may be taken from the upper counter only.

When the slide 280 is in its lower position, the forward end of the link 141ª is held between the rear vertical edge of the slide 280 and the lower stud 143, the link 141ª being thus compelled to reciprocate with the slide 144 whereby the lower counter is caused to function.

When the slide 280 is in its central or in its upper position, it exercises no control over the lower counter, as said slide is notched so as to allow the spring 285 to hold the link 141ª stationary in the forward position determined by contact of the lugs 158ª and 159ª. In the reciprocation of the slide 144 the lower stud 143 is free to move idly in the slot 142, hence the lower counter remains idle, except when a mechanism to be now described comes into play.

In order to place the lower counter in use when the slide 280 occupies the central position shown in Fig. 4, I provide means for eliminating lost motion between the link 141ª and the slide 144. Said means comprises a member 295 having a portion 296 arranged to be interposed between the lower stud 143 and a headed stud 297 on the link 141ª. The member 295 has a slot 298 through which the stud 297 extends, the member 295 being thus guided to move up and down so as to place the portion 296 between the studs 143 and 297 or to withdraw said portion. The lower end of the member 295 is pivoted at 299 to a crank arm 300 fixed on a shaft 301 which extends transversely through the machine frame. On the left-hand end of the shaft 301 is a device which virtually constitutes a yieldable crank arm, said device comprising a plate 302 fixed on the shaft 301 and a plate 303 pivoted on the plate 302 at 304. A contractile spring 305 is anchored at one end to the plate 302 and is connected at its other end to a pin 306 on the plate 303. The spring 305 normally holds the pin 306 against the adjacent edge of the plate 302, the plates 302 and 303 thus normally moving as a unit. In order yieldingly to hold the member 295 in either of its two positions, and to complete its movement into said positions, I provide a pivoted spring-actuated detent 307 comprising a pin 308 adapted to lie in either of two notches 309 in the plate 302.

To the crank arm composed of the parts 302 and 303 is pivoted at 310 a link 311, the upper end of which is guided for convenience upon a headed screw on the axis 6. The link 311 is arranged to be moved up and down to bring the portion 296 into and out of effective position by means including a bell crank pivoted in the machine frame to swing on the pivot 312. Said bell crank comprises an arm 313 having an elongated opening 314 to receive a stud 315 on the link 311. The arm 313 carries a member having a yieldable cam surface 316 and a dwell 317 arranged for engagement by a stud 318 fixed on the lever 5.

The surfaces 316 and 317 are formed upon one arm of a lever 319 which is pivoted to the arm 313 at 320. A tension spring 321 stretched between the other arm of the lever 319 and a pin 322 on the arm 313 normally holds said lever 319 with a stop portion 323 on said lever in contact with the pin 315. Rigid with the arm 313 is an upwardly extending arm 324 carrying a dog 325 which is yieldingly held against a stop lug 326 on the arm 324 by a torsion spring 327. On the lever 5 is a stud 328 to engage the dog 325 in the downward movement of said stud. In the upward movement of said stud the dog 325 is free to yield to allow the stud 328 to pass without causing movement of the bell crank 313, 324.

It will be seen that the stud 328 is adapted to cause upward movement of the link 311 for the purpose of withdrawing the portion 296 from between the studs 143 and 297, and that the stud 318 is arranged to cause downward movement of the link 311 for the purpose of inserting the portion 296 between the studs 143 and 297 and thus bringing the lower counter into use. However, the studs 318 and 328 must not be allowed to exercise control over the lower counter when said counter should remain idle, as when only the upper counter is to be used. I therefore provide means to deprive the studs 318 and 328 of control of the lower counter. In the present instance, said means includes a latch 329 (Fig. 1) pivoted at 330 and adapted to engage a notch 331 in the link 311. The latch 329 is yieldingly connected to an operating rod 332 by means of a spring 333 that tends to hold the latch against a collar 334 on the rod. The forward end of the rod is pivoted on a stud 335 on an arm 336 which is pivoted at 337. A contractile spring 338 tends to swing the arm 336 rearwardly so as to push the latch 329 away from the link 311.

The lower counter is idle in two cases, namely, when the counter-selecting lever 294 is in its lower position (in which the upper counter only is in use) and when the counter-selecting lever is in its middle position and a total is being taken from the upper counter.

Means is provided for holding the latch 329 in engagement with the link 311 when the counter-selecting lever is in its lower position, which means comprises a cam arm 339 (Fig. 1) arranged to be moved by a stud 340 on the bell crank 292. The cam arm 339 is fixed upon one end of a transverse pivot shaft 341. On the other end of said shaft is an arm 342 extending close to the stud 335. When the counter-selecting lever is swung to its lower position, the arm 342 draws the rod 332 forward against the tension of the springs 333 and 338. If the latch 329 is not already in engagement with the notch 311, it slips into said notch when the link is raised by the operation of the stud 328 against the dog 325. The member 295 is thus locked in its down position (Figs. 1 and 4). The spring 285 then holds the lower counter in idle or neutral position, as in Fig. 4.

When the counter-selecting lever 294 is in its central position, the arm 342 stands far enough away from the stud 335 so as not to interfere with the action of the spring 338 that throws out the latch 329.

When the counter-selecting lever 294 is in its central position and a total is to be taken from the upper counter, the latch 329 must be actuated to lock the member 295 in its down position, so that the lower counter shall remain idle. This result is attained in the present embodiment of the invention by making use of the slide bar 72 that serves to restore the differential stops to initial position, as fully explained in the Sundstrand Patent No. 1,198,487, dated September 19, 1916. Rigid with the arm 336 (Fig. 1) is an arm 343 having a cam portion 344 that is held depressed by a roller 73 on the slide bar 72 when the latter is in its forward position. When a digit is set up in the keyboard, the slide bar 72 is moved rearwardly far enough to withdraw the roller 73 from the cam portion 344, thus permitting the spring 338 to withdraw the latch 329, and thus allowing the member 290 to function, and permitting accumulation (i. e., addition or subtraction) in the lower counter. When a total is to be taken the slide bar 72 is always in its forward position, hence the latch 329 is held against the link 311 in readiness to slip into the notch 331 during the spacing stroke that precedes the taking of a total, and therefore the stud 328 is prevented from raising the member 295 into operative position, and the lower counter remains idle while the total contained in the upper counter is being printed.

It will be seen that the latch 329 is sensitive to the character of the operation to be performed. When an item is set up to be accumulated, the latch is rendered ineffective, thus allowing both counters to be used, whereas when a total is to be taken or a blank cycle is to be performed the latch is effective to prevent the lower counter from being conditioned for use.

Means is provided for preventing the counter-selecting lever 292 from being shifted from any of its positions after the Total key has been depressed. 345 is the stem of the Total key 346. Means of any preferred character, as, for example, that fully disclosed in said Sundstrand application Serial No. 236,575, may be employed to lock the Total key in depressed position. To the stem 345 is fixed a finger 347 that overlies an arm 348 comprised in the total-taking mechanism. The arm 348 is pivoted at 349. The forward end of the arm 348 has two notches 350 and 351 in its lower edge. On the upwardly extending arm of the bell crank 292 is a stud 352. When said bell crank is in its central position (as in Fig. 4), the stud 352 lies directly below the notch 350. Depression of the Total key causes the notched portion 350 to be placed in engagement with the stud 352, thus preventing movement of the counter-selecting lever 292 until after the total has been taken. When said lever is in its upper position, the stud 352 is directly below the notch 351, and thus will be engaged by said notch when the Total key is depressed. Similarly, when the lever 292 is in its lower position, the stud 352 is in such position that depression of the Total key will place the front edge 353 directly behind said stud and thus prevent the counter-selecting lever from being raised.

In order to prevent the counter-selecting lever 292 from being shifted after the handle 11 has been pulled and until the handle has returned to its normal position, I provide the means to be now described.

Referring to Figs. 4, 5a and 5b: In the lower edge of the link 290 are three notches 354, 355 and 356 for engagement by a lug 357 on a latch 358. Said latch is pivoted at 359 to a bracket 360 fixed in the machine frame. A headed stud 361 on the bracket 360 projects through a slot in the latch and prevents lateral displacement of the latch. A contractile spring 362 connected to the latch and anchored to the bracket tends to move the latch into engagement with the link 290. When the handle 11 is in initial position, the latch is held out of engagement with the link through the engagement of the crank arm 8 with a projection 363 on the latch. As shown in Fig. 4, when the counter-selecting lever 292 is in its central position, the middle notch 355 is directly above the lug 357. The notches 354 and 356 correspond in spacing to the upper and lower positions, respectively, of the counter-selecting lever. It will be seen that as soon as the handle 11 is moved out of its initial position, the latch 358 holds the link 290 from movement, and continues to detain the link until the handle has returned to initial position.

The operation of the machine may be summarized and its capabilities indicated as follows:

Assuming both counters to be clear, the handle being in its initial position and the counter-selecting lever 292 being in its central or A and B position, the parts at the right-hand side of the machine are in the position indicated in Fig. 4 and the mechanism at the left-hand side of the machine is in the position illustrated in Fig. 1. The upper counter will be operated by the slide 144. We will assume that the operator has a succession of items to accumulate, but desires to obtain separate totals of certain groups. Referring to Fig. 8, the operator sets up 1.25 in the keyboard, and the resulting rearward movement of the slide bar 72 carries the stud 73 away from the cam portion 344 and allows the spring 338 to move the latch 329 out of the notch 331. The operator then pulls the handle. In the early portion of the forward stroke the slide 144 moves forward away from the link 141a. As the handle completes its forward stroke, the portion 296 is inserted between the lower stud 143 and the stud 297 through engagement of the stud 318 with the cam surface 316. Near the beginning of the return stroke of the handle the lower counter is moved into mesh with the forward racks to accumulate the item of 1.25 as the racks descend. At the completion of the return stroke the parts at the left-hand side of the machine are in the position illustrated in Fig. 6. The upper counter was moved into and out of mesh with the rear racks in proper time to accumulate the item of 1.25.

After setting up 7.89 in the keyboard the handle is again pulled. In the early portion of the forward stroke the slide 144 moves forward, carrying with it the link 141a. Since the portion 296 is still in its upper position, the lower counter is thus placed in neutral position. As the handle continues in its forward stroke the abutment is lowered through engagement of the stud 328 with the dog 325 and the consequent raising of the link 311. Further on in the forward stroke of the handle the portion 296 is again inserted between the studs 143 and 297 through the engagement of the stud 318 with the cam surface 316. In the return stroke of the handle the slide 144 is moved rearwardly, carrying with it the link 141a, whereby the lower counter is placed in mesh with the forward racks to accumulate the item of 7.89. Said item was also accumulated in the upper counter.

The operator now takes a blank stroke. During the early portion of the forward handle stroke the slide 144 is moved forward, carrying with it the link 141a. A little later in the forward stroke the portion 296 is lowered through the engagement of the stud 328 with the dog 325. In the return stroke of the handle the slide 144 is moved rearwardly, the link 141a remaining stationary.

The operator now depresses the Total key and pulls the handle. In the early portion of the return stroke the slide 144 is moved forward to withdraw the upper counter from the rear racks, thus leaving the upper counter in cleared condition after the printing of the total which was contained in said counter. The lower counter has remained in its neutral position, the total which was cleared from the upper counter, of course, remaining in the lower counter. It will thus be seen that the operator has obtained an individual total of the first two items, but has retained said total in the lower counter without shifting the counter-selecting lever 293. The portion 296 remained down during this cycle, as the latch 329 prevented operation of the link 311 by the lever 5, the cam surface 316 yielding to allow the stud 318 to pass.

The operator may now proceed to list and register further items and may then take an individual total (5.79) of such further items, as indicated in Fig. 8, thus clearing the upper counter.

The operator may now total all of the items and clear the lower counter by first shifting the counter-selecting lever 292 to the upper position. The raising of the counter-selecting lever causes the slide 280 to be lowered to withdraw the upper end of said slide from engagement with the link 141 and to present the rear vertical edge of said slide to the forward end of the link 141a. The withdrawal of the upper end of the slide 280 from engagement with the link 141 immediately permits the spring 285 to place the cleared upper counter in neutral position. The lower counter is in mesh with the forward racks.

The operator then takes a blank stroke. During the forward stroke of the handle the slide 144 is moved rearwardly to withdraw the lower counter from the forward racks. At the commencement of the return stroke the lower counter is returned into mesh with the front racks. The operator then depresses the Total key and pulls the handle. The lower counter remains in mesh with the racks during the forward stroke of the handle, whereby the type bars are positioned for printing the total of all the items (14.93). Near the beginning of the return stroke of the handle the lower counter is withdrawn from the racks, leaving said counter clear. At the end of the return stroke the lower counter is returned into engagement with the forward racks.

Figs. 9 to 15 illustrate diagrammatically the varying relations of the counters A and B to the two sets of racks while an item is being entered in both counters and while a final total is being taken from the A counter with the counter-selecting lever 294 in middle position.

Figs. 16 and 17 illustrate diagrammatically the relations of the counters to the racks while a final total is being taken from the B counter with the counter-selecting lever 294 in the upper or B-counter-selecting position.

It will be seen that the operator can obtain totals from the upper or A counter without shifting the counter-selecting lever from the A and B position, thus obviating the danger of inadvertently failing to return the lever to A and B position.

While the present embodiment of the invention has been described in considerable detail it will be understood that various changes may be made within the scope of the appended claims.

I claim as my invention:

1. The combination of a counter, controlling means for the counter including a connection capable of lost motion to render the controlling means ineffective, a member arranged to be interposed in said connection to eliminate such lost motion, means for operating said member including a bell crank, means to hold said bell crank against movement, a cam member on one arm of said bell crank arranged to yield when the bell crank is held against movement, a dog on the other arm of the bell crank arranged to yield in a certain direction, and means engaging said dog and cam member for normally rocking the bell crank.

2. The combination of a counter, controlling means for the counter including a bell crank, means to hold said bell crank against movement, a cam member on one arm of said bell crank arranged to yield when the bell crank is held against movement, a dog on the other arm of the bell crank arranged to yield in a certain direction, and means engaging said dog and cam member for normally rocking the bell crank.

3. The combination of a counter, controlling means for the counter including a bell crank, means to hold said bell crank against movement, a cam member on said bell crank arranged to yield when the bell crank is held against movement, a dog on said bell crank arranged to yield in a certain direction, and a lever having two members engaging said dog and cam member respectively for normally rocking the bell crank.

4. The combination of two counters, racks to actuate the counters, means for moving the counters into and out of operative relation to the racks, said means including a reciprocatory member and two links connected to said member by lost-motion connection, and a counter-selecting member having one position for the selection of a certain counter, another position for the selection of the other counter, and an intermediate position for the selection of both counters, automatically actuated mechanism for eliminating lost motion in the connection between one of said links and said reciprocatory member, and means for disabling said mechanism when said counter-selecting member is in one of the first-mentioned two positions.

5. The combination of two counters, racks to actuate the counters, means for moving either counter into and out of operative relation to the racks, said means including a reciprocatory member and two links connected to said member by lost-motion connections, automatically actuated mechanism for eliminating lost motion in the connection between one of said links and said member, and means for disabling said mechanism when a total is to be taken from one of the counters.

6. The combination of two counters, racks to actuate the counters, means for moving either counter into and out of operative relation to the racks, said means including a lost-motion connection and means for eliminating lost motion in said connection to render said counter-moving means effective to move a certain counter, and means for automatically disabling the lost-motion-eliminating means when a total is to be taken from the other counter.

7. The combination of two counters, racks to actuate the counters, means for moving either counter into and out of operative relation to the racks, said means including a lost-motion connection and means for eliminating lost motion in said connection to render said counter-moving means effective to move a certain counter, and means sensitive to the character of the operation to be performed for disabling the lost-motion-eliminating means.

8. The combination of two sets of racks which face each other, two counters mounted on parallel axes between said sets of racks, and means to control the engagement of the counters with said sets of racks, said means including automatically-actuated mechanism to control the engagement of a certain one of the counters with said sets of racks, and means for disabling said automatically-actuated mechanism when a total is to be taken from the other counter.

9. The combination of two counters, racks to actuate the counters, means for moving said counters into and out of operative relation to the racks, means for determining which counter shall be so moved or that both shall be so moved, said determining means including manual means controlling both counters and automatically-actuated mechanism controlling a certain one of said counters, and means sensitive to the character of the operation to be performed for disabling said mechanism when a total is to be taken from the other counter.

10. The combination of two counters, racks to actuate the counters, means for moving the counters into and out of operative relation to the racks, means for determining which counter shall be so moved or that both counters shall be so moved, and automatically actuated means sensitive to the character of the operation to be performed for modifying the action of said determining means when a total is to be taken from a certain one of the counters.

11. The combination of two counters, racks to actuate the counters, means for moving the counters into and out of operative relation to the racks, means for determining which counter shall be so moved or that both counters shall be so moved, said determining means including a counter-selecting member having one position for the selection of a certain counter, another position for the selection of the other counter, and an intermediate position for the selection of both counters, said determining means also including automatically-actuated mechanism controlling one of the counters, and means sensitive to the character of the operation to be performed for disabling said mechanism when said counter-selecting member is in one of the first-mentioned two positions.

12. The combination of two selectively and simultaneously operable counters, means for selectively and simultaneously accumulating items in both counters, and means acting upon one of said counters for automatically rendering said counter ineffective when a total is to be taken from the other counter said last mentioned means being sensitive to the character of the operation to be performed.

13. The combination of two counters, means for selecting either or both counters for use, and mechanism for taking a total from a certain one of the counters while said selecting means is in both-counters position said mechanism including a latch which is sensitive to the character of the operation to be performed.

14. The combination of two counters, a counter-selecting member having one position for the selection of a certain counter, another position for the selection of the other counter, and an intermdediate position for the selection of both counters, and counter-controlling means arranged to be disabled when said counter-selecting member is in one of the first-mentioned two positions said means being sensitive to the character of the operation to be performed.

15. The combination of a plurality of counters, counter-selecting means having positions corresponding to the selected counter, means under the control of said selecting means for placing either or both counters in use and counter-controlling means arranged to be disabled when said counter-selecting means is in one of its positions said counter-controlling means being sensitive to the character of the operation to be performed.

16. The combination of a plurality of counters, a counter-selecting member having more than two effective positions and counter-controlling means arranged to be disabled when said counter-selecting member is in one of said positions said means being sensitive to the character of the operation to be performed.

17. An adding machine having, in combination, two counters, a part which is moved out of its normal position when a digit is set up in the machine, a spring-actuated lever which is moved against the influence of its spring by engagement with said part when the latter is moved to its normal position, and means for controlling one of the counters, said means including a latch connected to said lever and moved into effective position when said part returns to its normal position.

18. An adding machine having, in combination, two counters, a counter-selecting member having one position for the selection of a certain counter, another position for the selection of the other counter, and an intermediate position for the selection of both counters, a Total key, and means operated by the Total key for latching said counter-selecting member against movement when the Total key is in depressed position.

19. An adding machine having, in combination, two counters, one of said counters being normally conditioned for operation, the second of said counters being normally disabled, and means for simultaneously accumulating items in both counters, actuation of said last mentioned means automatically enabling said second counter.

20. An adding machine having in combination, two counters, a counter-selecting member having one position for the selection of a certain counter, another position for the selection of the other counter and an intermediate position for the selection of both counters, means for simultaneously accumulating items in both counters and means for taking a total from one of the counters with said selecting member in its two-counter position, one of said counters being normally conditioned for operation when said selecting member is in its two-counter position, the second of said counters being normally disabled when said counter-selecting lever is in its two-counter position.

21. A computing machine having, in combination, a keyboard containing amount keys, a plurality of counters, means for rotating the counters in accumulating and totaling operations, and means sensitive to the amount keys for automatically rendering operative one of the counters for an accumulating operation when an item is set up in the keyboard.

22. A computing machine having, in combination, a keyboard, a plurality of counters, means for rotating the counters in accumulating and totaling operations, means for rendering operative the counters in accumulating and totaling operations, and means for automatically preventing a certain one of the counters from being rendered operative when no item is set up in the keyboard.

23. A computing machine having, in combination, a keyboard; two counters; means for rotating the counters in accumulating and totaling operations; and means for controlling the counters in accumulating and totaling operations, the last mentioned means including a control member having one position wherein it renders operative one counter only and another position wherein it renders operative the other counter only, and means for automatically rendering operative said other counter when an item is set up in the keyboard.

24. A computing machine having, in combination, a keyboard, two counters, means for rotating the counters in accumulating and totaling operations; and means for controlling the counters in accumulating and totaling operations, the last mentioned means including a control member having one position wherein it renders operative one counter only and another position wherein it renders operative the other counter only, means for automatically rendering operative said other counter for an accumulating operation when an item is set up in the keyboard, and means for automatically disabling said automatic means when no item is set up in the keyboard.

WALTER A. ANDERSON.